United States Patent
Gold

[11] 3,985,520
[45] Oct. 12, 1976

[54] GASIFICATION PROCESS AND APPARATUS

[76] Inventor: Louis Gold, 2725 - 39th St., Northwest, Washington, D.C. 20007

[22] Filed: June 26, 1975

[21] Appl. No.: 590,743

Related U.S. Application Data

[63] Continuation-in-part of Ser. No. 355,400, April 30, 1973, abandoned.

[52] U.S. Cl. .................................... 48/202; 48/210; 48/101; 75/41
[51] Int. Cl.² ........................... C10J 3/00; C10J 3/16
[58] Field of Search ............. 48/210, 209, 197, 101, 48/202; 75/41, 42

[56] References Cited
UNITED STATES PATENTS

| | | | |
|---|---|---|---|
| 2,593,257 | 4/1952 | Bradley | 48/210 |
| 2,684,897 | 7/1954 | Diettrich et al. | 75/41 |
| 3,463,631 | 8/1969 | Vayssiere et al. | 23/230 PC |
| 3,528,800 | 9/1970 | Blum et al. | 23/230 PC |

Primary Examiner—R.E. Serwin
Attorney, Agent, or Firm—Sughrue, Rothwell, Mion, Zinn and Macpeak

[57] ABSTRACT

In addition to introducing steam and/or oxygen in the heated airblast through the tuyeres of a conventional blast furnace to provide a blast furnace gas enriched with carbon monoxide and hydrogen, air and/or steam can be forced through the molten pig iron which has been withdrawn from the blast furnace into a separate reactor having a modified construction similar to the basic oxygen furnace for the purpose of producing large volumes of hydrogen. The blast furnace gasses can be combined with the gasses from the reactor to provide a clean burning fuel for use in power plants and the like or the hydrogen from the reactor can be utilized directly in fuel-cell technology. The resulting iron oxides (magnetite, etc.) which result from the pig iron-steam reaction can then be recycled through the blast furnace.

10 Claims, 4 Drawing Figures

GASIFICATION PROCESS AND APPARATUS

REFERENCE TO RELATED APPLICATION

This application is a continuation-in-part of application Ser. No. 355,400 filed Apr. 30, 1973, entitled "Clean Energy Sources From Efficient Conversion of Coal and Related Fossil Fuels: Controlled Emissions and Electric Power Generation and Gasification Processes", now abandoned.

BACKGROUND OF THE INVENTION

The growth of the coal industry has been arrested in part by the expectancy that nuclear fuels would prove to be cleaner and much more economical. This circumstance has failed to materialize, with nuclear power today furnishing only a mere fraction of the energy derived from coal. However, the critical demand for escalating levels of power is presently confronted with strenuous environmental objections to the liquid metal fast breeder reactor believed to be the answer to the energy impasse while the burning of coal by the electric utility companies remains stymied in the face of stringent emission codes imposed.

To further exacerbate the grim energy outlook, the exhaustion of the much more limited reserves of oil and natural gas is threatened. Against this background, coal looms as the only realistic way out of a most frustrating position if only it could be burned without attendant pollution hazards and/or practical gasification-liquification actually achieved. In brief, the vast stores of coal could insure a reasonable abundance of energy for centuries to allow sufficient time for the advent of revolutionary developments such as the controlled release of thermonuclear energy, perhaps in the form of laser-induced fusion.

Emergency measures have been taken to exert an effort to find ways of purging coal of its objectionable impurities, largely sulfur and the ash residue. In this age of intense overspecialization, it is not entirely strange that virtually an entire realm of well-established technology that had already addressed itself rather successfully to this problem in a different context has been overlooked.

The Iron and Steel Industry, over the course of many years, came to grips with the challenge of producing high quality ferrous metals and alloys, not least of which was the control of impurities. The blast furnace represents a remarkable means to manufacture voluminous amounts of raw pig iron relatively uncontaminated by a host of foreign substances contained in ore, limestone and coke, constituting the starting materials. The smelting process performed in the blast furnace restrains the entry of undesired impurities into the molten pig iron; the chemistry is tailored to purge such components as sulfur and ash as they are taken up principally by the slag. Subsequent refinement of the pig iron gives rise to high quality steel products.

The practical economics of blast furnace operations spurred the refinement of the gaseous byproducts for the recovery of fine particulates (dust) to be recycled and the manufacture of a clean gaseous fuel for heating of the air blast and for power generation for diverse ancillary purposes not least of which is the driving of compressors.

Viewed from such a vantage point, the clean use of coal has a tradition to turn to but with the provision to institute meaningful changes where prudent. Thus, the present invention, while based upon blast furnace technology, embodies several innovations which will help the coal industry which has tended to stagnate over recent years.

It is well known in the blast furnace art to introduce oxygen and/or steam with the air blast or as a substitute for the air blast to provide an enriched blast furnace gas. If the steam is introduced at the lower tuyere level water gas will be produced as a result of the standard steam-coke reaction. If steam is introduced in the upper levels of the furnace it will react with the nascent iron to produce $H_2$.

It is also well known in the steel making art to blow oxygen through molten pig iron in the basic oxygen furnace to remove the carbon from the pig iron.

SUMMARY OF THE INVENTION

The present invention provides a new and improved process for the production of a high caloric fuel gas involving the clean combustion of ore and limestone consonant with the formation of pig iron and a liquid slag into which the impurities, largely sulfur and ash, can pass.

The present invention provides for the production of large volumes of hydrogen by the passage of steam through molten pig iron in a reactor separate from the blast furnace with the resulting iron oxides being recycled through the blast furnace with the addition of suitable amounts of coal/coke and limestone to once again reduce the iron oxides to molten pig iron. Scrap iron may be added to the reactor to reduce the cost.

The present invenion provides for the production of conventional blast furnace gases comprised mostly of carbon monoxide, carbon dioxide and nitrogen which can be mixed with hydrogen generated from the steam treatment of the molten pig iron in a separate reactor for a valuable caloric fuel or for subjection to catalytic methanation.

The present invention also provides for the introduction of an oxygen blast through the molten pig iron in the reactor prior to the introduction of steam to burn off the carbon. The resulting CO can be collected and portions of the refined pig iron can be withdrawn prior to the introduction of steam and used in the manufacture of steel products.

The present invention also provides for the introduction of steam with the air blast or through separate tuyeres in the blast furnace for the production of hydrogen to enrich the blast furnace gas. It is also contemplated to use oxygen or oxygen-enriched air for the air blast in the blast furnace to further enrich the blast furnace gas with CO. However, the CO and $H_2$ will be diluted by the large volume of $N_2$ in the blast.

The foregoing and other objects, features and advantages of the invention will be apparent from the following more particular description of a preferred embodiment of the invention as illustrated in the accompanying drawings.

DETAILED DESCRIPTION OF THE INVENTION

This invention relates to the conversion of coal and other fossil fuels into environmentally "clean" fuels, that is, fuels which can be burned without the production of sulfurous oxides or other undesirable atmospheric contaminants.

More particularly, the present invention is addressed to suitable modification of the blast furnace whereby it can accommodate as part of its charge, large amounts of high sulfur coal while producing an environmentally clean gaseous fuel which could be used as a substitute for natural gas. The enrichment and augmentation of the gas produced in the blast furnace is achieved by the introduction of steam at predetermined levels of the blast furnace as well as the steam treatment of the molten pig iron in a separate reactor vessel. If the steam is introduced in the upper levels of the furnace it will react with the nascent iron to produce $H_2$.

The injection of steam into the blast furnace can result in an increase of CO and $H_2$ in the product gas. The introduction of steam can be effected at more than a single location, for example, in the air blast through the tuyeres, as well as at higher levels of the furnace where the reaction of steam with newly formed sponge iron radically alters the composition and amount of stack gas produced. Further increase in the production of gas from the furnace can be effected by the introduction of steam into the molten pig iron preferably in combination with air or oxygen with suitable means for recovering the resulting gasses. The iron oxides formed by the oxidation of pig iron can be recycled to the blast furnace thereby decreasing the requirement for raw iron ore. Scrap iron in predetermined quantities can be added to the blast furnace.

It will be appreciated that by operating the blast furnace in the manner described important environmental advantages ensue because the ash and sulfur are both captured in the furnace slag and the blast furnace gas is sufficiently sulfur free to meet environmental standards as a clean fuel. The blast furnace gas may be additionally enriched in hydrogen.

Figure 1:
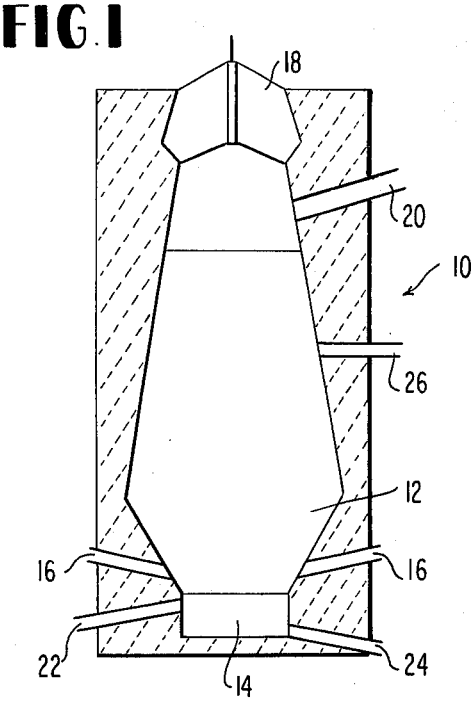
FIG. 1 is a schematic view of the blast furnace according to the present invention.

FIG. 1 of the drawing shows a schematic view of a conventional blast furnace 10 provided with a bosh 12, a hearth 14, tuyeres 16, a double bill arrangement 18 for introducing the charge, a gas withdrawal line 20, a slag hole 22 for withdrawing liquid slag and a metal hole 24 for withdrawing molten pig iron all in a manner known per se. As indicated previously, the hot air blast which is introduced through the tuyeres can also be substituted by oxygen or air enriched with oxygen and/or steam to cause an enrichment of the blast furnace gas withdrawn through the outlet 20 with carbon monoxide and hydrogen. If it is desired to increase the $H_2$:CO ratio of the gas at the synthesis level steam maybe introduced in line 26 approximately at the 1,000° F level.

Figure 2:
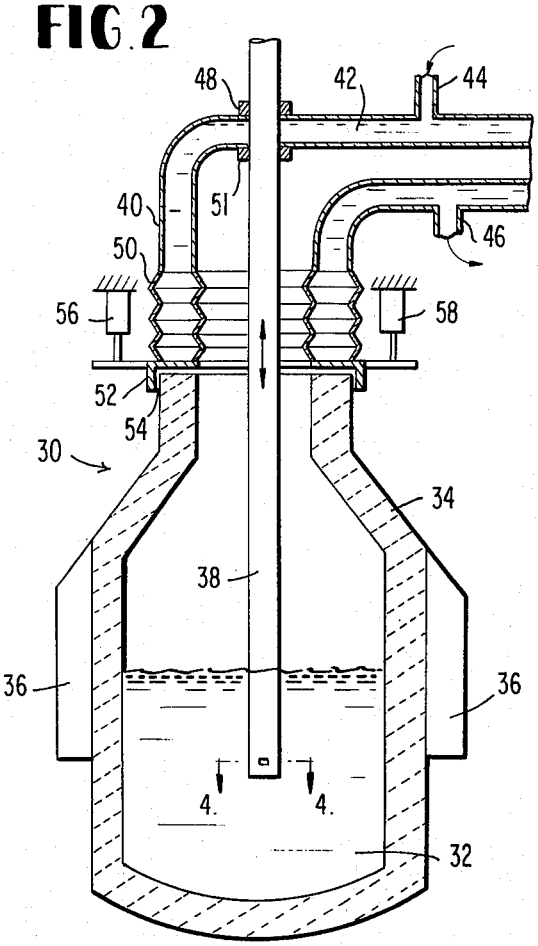
FIG. 2 is a schematic view of the reactor for forcing steam through the pig iron according to the present invention.

The pig iron reactor 30 shown in FIG. 2 is constructed similar to the basic oxygen furnace and is adapted to be filled with a charge of molten pig iron in the conventional manner. The vessel 34 is provided with trunions 36 which allow the vessel to be pivoted for receiving the molten pig iron and for discharging iron oxides after the oxidation to a predetermined extent. A lance 38 similar to the oxygen lance in the basic oxygen furnace is adapted to be inserted and retracted from the molten pig iron in the conventional manner. However, as opposed to the basic oxygen furnace the reactor according to the present invention is provided with an outlet conduit 40 for collecting the gasses produced in th vessel 34. Due to the hot nature of the effluent gasses collected by the conduit 40 the conduit should be a doubled-walled conduit providing with a water jacket 42 through which water may be circulated from an inlet 44 to an outlet 46. Suitable seals 48 and 50 are provided in the wall of the conduit 40 to allow for the sliding movement of the lance 38. In order to collect all of the top of the vessel 34 and in order to accomplish this, a flexible metal bellows 50 is provided at the end of the pipe. Secured to the end of the bellows 50 is a flange member 52 having suitable heat resistant sealing material 54 attached thereto, which is adapted to fit over the top edge of the vessel 34 in tight sealing engagement. In order to move the flange 52 and seal 54 into sealing engagement with the lip of the vessel 34, a pair of hydraulic cylinders 56 and 58 or any other suitable actuating means may be provided. In order to charge and discharge the vessel 34, it will be necessary to retract the sealing flange 52 to allow for tilting of the vessel 34.

Figure 4:
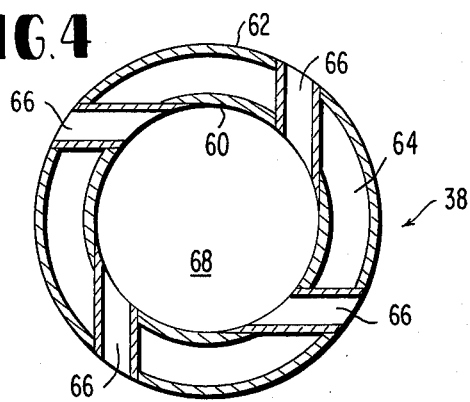
FIG. 4 is a detailed view of a blow lance showing the tangential nozzle arrangement.

The detailed construction of the lance 38 is best shown in FIG. 4 which is a sectional view taken along the line 4—4 on FIG. 2. The lance 38 is provided with an inner wall 60 and an outer wall 62 defining a hollow passage 64 through which a coolant such as water or the like may be circulated. A plurality of apertures 66 extend through the walls from the central passage 68. The apertures 66 are substantially tangential to the inner wall 60 so that the flow of gasses from the end of the lance into the hot molten pig iron will create a swirling effect. By creating a swirling motion within the molten pig iron, the reaction taking place is greatly enhanced. It is contemplated that initially a blast consisting partly or exclusively of oxygen could be directed through the flange into the molten pig iron to burn off the carbon and raise the melt temperature for a slower subsequent steam blow. The carbon monoxide which results from a burning off of the carbon is initially diverted to a storage facility through the pipe 40, thereby serving to flush out all of the air from the upper portion of the reaction vessel 34 and the pipe 40 before introducing steam through the lance for the production of hydrogen.

The introduction of steam and $O_2$ simultaneously will catalytically react with Fe and $FeO_y$ to convert the CO and $H_2$ to methane ($CH_4$).

The introduction of an air blast through the lance would initially generate a bosh-type composition gaseous fuel comprised of 35% carbon monoxide and 65% nitrogen. Oxygen enriched air clearly would mean an increased fuel value, but this would not be the prime reason for introducing oxygen. The cost of the latter could be more than compensated for in terms of the advantage of suppressing heat loss from the molten pig iron in the reactor. Replacing the air blast with oxygen clearly would lead to intensified heating without the cooling effect of the nitrogen otherwise present.

Hence, the refinement period can be further extended and by producing very large volumes of molten pig iron and by controlling the surface to volume condition carefully a greatly increased production of hydrogen can be expected.

Figure 3:
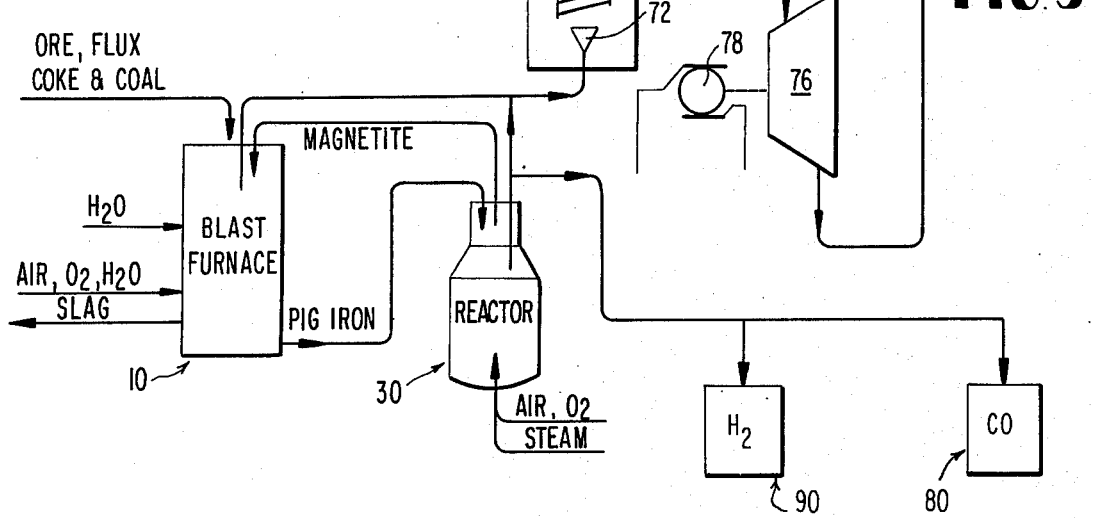
FIG. 3 is a flow diagram for the process according to the present invention.

The overall gasification and power generation system envisioned by the present invention is shown schematically in FIG. 3. As mentioned previously, the blast furnace is charged with iron ore, some scrap iron, a fluxing agent such as limestone, coke and coal without regard to the sulfur content of the coal. The blast furnace is provided with a conventional tuyere system to provide a hot blast of air to the combustion zone. In addition to the air blast, oxygen and steam may also be introduced through the tuyeres to provide for increased amounts of carbon monoxide and hydrogen in the blast furnace gas. Additional steam may be introduced into the blast furnace at the synthesis level to provide for an increased production of hydrogen in the blast furnace gas. As shown in the schematic of FIG. 3, the blast furnace gas is directed to a heat exchanger 70 and after passing through a conventional scrubber/electrostatic precipitator arrangement (not shown) to remove dust particles from the gas, the gas can be used directly as a clean burning fuel for the burner 72. The steam generated in the heating coil 74 is directed to a turbine 76 which in turn drives a generator 78 for the production of electric power.

The pig iron which is taken off from the bottom of the blast furnace is transported by conventional means and poured into the reactor 30. As previously indicated, the reactor vessel 34 is tilted to allow for the introduction of the molten pig iron and is subsequently raised to the vertical position prior to the blowing of gasses therethrough. Flange 52 of the conduit 40 is moved into tight sealing engagement with the lip of the reactor vessel 34 and initially and/or oxygen are introduced into the molten pig iron through the lance 38 for the generation of carbon monoxide. By a suitable valving arrangement on the conduit 40 the carbon monoxide can be directed to a storage tank 80 and in the process the conduit will be purged of air prior to the introduction of steam to the lance 38. The subsequent blast of steam through the molten pig iron reacts with the iron to release hydrogen and form iron oxides (magnatite, etc.). The hydrogen can be mixed with the blast furnace gas to enrich the same for power generation purposes or be directed to a hydrogen storage tank 90 for future use in fuel cell technology or other technologies requiring large volumes of hydrogen. It is also contemplated that the blast furnace gas enriched by the hydrogen from the reactor could provide a suitable synthesis gas of pipeline quality for distribution commecially. The steam iron reaction is carried out in the reactor to approximately 90% completion thereby still maintaining a liquidus, somewhat slushy mixture which is still capable of being readily removed from the reactor upon tilting of the same. The entire charge is then recycled back through the blast furnace for subsequent reduction and regeneration of molten pig iron.

Instead of using a reactor such as illustrated in FIG. 2 which is similar to the basic oxygen furnace, it is also contemplated to use a reactor identical to the standard Bessemer converter wherein the blast is introduced through bottom apertures in the vessel. With the Bessemer-type converter in the tilted position, a charge of molten pig iron is introduced therein up to the level of the apertures. A blast of air and/or oxygen is introduced through the apertures and the converter is tilted to the upright position so that the blast will be forced upwardly through the molten pig iron. As soon as the converter reaches the upright vertical position a conduit having a movable bellows-type end similar to that shown in FIG. 2 is moved into sealing engagement with the top of the converter to collect the gasses. After a predetermined time the blast could be switched exclusively to steam for the relatively pure production of $H_2$.

As an example for bottom blow using a Bessemer-type reactor, 100 tons of pig iron are maintained at 1400° C in the reactor which has a diameter of 10 feet to provide an approximate volume of $10^3$ cubic feet. The vessel has an approximate 100 tone capacity which is approximately equal to $10^5$ kg. which in turn is equal to $10^8$ gms. and the volume approximates $10^7$ cc or $10^4$ liters. It is contemplated that 10 runs of the reactor could be accomplished daily with each unit lasting approximately one hour. The amount of steam required involves approximately 100 tons of water which amounts to about $10^4$ gallons per blow or approximately $10^5$ gallons per day. Thus, each blow would produce approximately $10^7$ cubic feet of hydrogen for a daily output of $10^5$ kg. of hydrogen.

Therefore, if a blow period lasted for approximately one hour, or say 1,000 seconds, the flow rate for steam would be approximately $10^4$ cubic feet per second. This is a very high rate which must be spread over a large area for reasonable steam flux. If the conduit has a cross-section of approximately 100 square feet, a flow rate of approximately 100 per second per foot$^3$ would be achieved. A surge storage tank would be needed for the hydrogen released during a blow operation and the customary safeguards for the handling of large quantities of hydrogen would be required.

What is claimed is:

1. A process for the production of hydrogen comprising producing a quantity of molten pig iron in a blast furnace, charging said molten pig iron into a separate reaction vessel, passing steam through the molten pig iron in said reactor to produce iron oxides and hydrogen, collecting said hydrogen and recycling said iron oxides through said blast furnace.

2. A process as set forth in claim 1 wherein the reaction of said steam and molten pig iron takes place in a closed environment.

3. A process as set forth in claim 1 further comprising passing steam through the charge in said blast furnace to provide a hydrogen enriched blast furnace gas.

4. A process as set forth in claim 1 further comprising passing oxygen through the charge in said blast furnace to provide a carbon monoxide enriched blast furnace gas.

5. A process as set forth in claim 3 wherein the hydrogen produced in said reactor is added to said blast furnace gas to enrich the same.

6. A process as set forth in claim 4 wherein the hydrogen produced in said reactor is added to said blast furnace gas to enrich the same.

7. A reactor for the production of gasses from molten pig iron comprising a vessel having an open top adapted to receive a charge of molten pig iron, means for pivoting said vessel from a tilted position for assisting in charging and discharging the molten material to a substantially vertical position, blast means for introducing a gaseous blast through the molten pig iron and conduit means having movable sealing means at one end adapted to be moved into tight sealing engagement with the top of said vessel to provide for the collection of all gasses emanating therefrom.

8. A reactor as set forth in claim 7 wherein said blast means are provided for in said conduit means.

9. A reactor as set forth in claim 7 wherein said blast means is comprised of a lance adapted to be extended into and withdrawn from the vessel through the top thereof.

10. A reactor as set forth in claim 7 wherein said blast means is comprised of a plurality of apertures in the bottom of said vessel and additional conduit means adapted to supply a gaseous blast through said apertures.

* * * * *